United States Patent
Kataoka et al.

(10) Patent No.: US 6,327,104 B1
(45) Date of Patent: *Dec. 4, 2001

(54) MAGNETIC RECORDING AND REPRODUCING APPARATUS COMPRISING A MAGNETIC HEAD CLOGGING DETECTING UNIT

(75) Inventors: Kazuhiro Kataoka, Ibaraki; Tsutomu Kase, Higashiosaka, both of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,376

(22) Filed: Sep. 28, 1998

(30) Foreign Application Priority Data

Sep. 26, 1997 (JP) .................................... 9-261654

(51) Int. Cl.⁷ .............................. G11B 27/36; G11B 5/10
(52) U.S. Cl. ............................. 360/31; 360/128
(58) Field of Search ............................ 360/31, 64, 128

(56) References Cited

U.S. PATENT DOCUMENTS

| | | |
|---|---|---|
| 4,827,361 | 5/1989 | Yoshioka . |
| 5,193,033 | 3/1993 | Shimoi et al. . |
| 5,694,263 | 12/1997 | Miyahara et al. . |

FOREIGN PATENT DOCUMENTS 59-104707    6/1984   (JP) .

*Primary Examiner*—Nabil Hindi
*Assistant Examiner*—Regina Y Neal
(74) *Attorney, Agent, or Firm*—Ratner & Prestia

(57) ABSTRACT

A magnetic recording and reproducing apparatus has a recording magnetic head and a reproducing magnetic head disposed on a rotary cylinder, and a magnetic head clogging detecting unit for detecting clogging of the recording magnetic head by monitoring the output of the reproducing magnetic head. In this magnetic recording and reproducing apparatus, for saving power consumption, magnetic head clogging is detected intermittently only in predetermined periods, and in other periods the operation of the head clogging detecting unit is stopped. As a method of stopping the operation of the magnetic head clogging detecting unit, the power supply of the magnetic head clogging detecting unit is turned off. The width and interval of detection periods and detection sensitivity of magnetic head clogging detection can be freely set by the user. Further, in the case of magnetic recording and reproducing apparatus having plural sets of recording magnetic heads and reproducing magnetic heads disposed on the rotary cylinder for drawing plural track patterns on a magnetic recording tape, by changing over the outputs of the reproducing magnetic heads, and putting the outputs into the common magnetic head clogging detecting unit, in addition to the above method, the power consumption necessary for magnetic head clogging detection can be further saved.

11 Claims, 4 Drawing Sheets

MAGNETIC RECORDING AND REPRODUCING APPARATUS COMPRISING A MAGNETIC HEAD CLOGGING DETECTING UNIT

BACKGROUND OF THE INVENTION

The present invention relates to a magnetic recording and reproducing apparatus having a function of detecting clogging of a magnetic head occurring when recording or reproducing video or audio signals on a magnetic recording tape through the magnetic head.

Clogging of a magnetic head is a phenomenon that dust or magnetic powder accumulates on the area contacting with a magnetic recording tape around a gap of the magnetic head. Clogging of magnetic head impedes normal contact of the magnetic head and the magnetic recording tape, or changes magnetic characteristics of the magnetic head. As a result, normal magnetic recording is disabled.

A technology of detection of clogging of magnetic head is disclosed, for example, in Japanese Laid-open Patent No. 59-104707 (laid open on Jun. 16, 1984). Herein, a reproducing magnetic head is disposed at a position on a rotary cylinder, different from that of a recording magnetic head, and clogging of the magnetic head in recording operation is detected by continuously monitoring the output of the reproducing magnetic head.

Including this example, in the method of detecting clogging of magnetic head, the amplitude value of reproduced signal at the time of deterioration of video recording quality and the envelope of reproduced signal are compared. In this method, when the envelope of reproduced signal is small, it is judged that recording abnormality due to clogging of magnetic head occurs, and a detection signal (alarm signal) is issued.

In this method, however, to detect clogging of magnetic head when recording, the magnetic head clogging detecting device is being operated continuously. It increases the power consumption of the magnetic recording and reproducing apparatus. In particular, in the case of a video tape recorder with a built-in camera which is often driven by a battery, this problem is troublesome. The increase in power consumption of the video tape recorder with a built-in camera has a substantial effect on the battery life.

A more specific example is given below.

Battery-driven portable video tape recorders with a built-in camera are widely used recently for broadcasting and professional use, in news gathering activities, and the like. In such applications, detection of clogging is necessary for recording securely. At the same time, in order to record for a longer time, it is also necessary to suppress the increase of power consumption due to detection of clogging.

Moreover, in the portable video tape recorder with a built-in camera, in order to reduce its size, the body of apparatus is required to be smaller. Downsizing of the body of apparatus is a troublesome condition for temperature rise due to power consumption in the electric circuit. Therefore, also for the purpose of reducing the size of the body of apparatus, it is demanded to suppress increase of power consumption due to detection of clogging.

SUMMARY OF THE INVENTION

It is hence an object of the invention to provide a magnetic recording and reproducing apparatus capable of reducing power consumption when recording.

In the invention, detection of clogging of magnetic heads in recording is done intermittently only for predetermined periods, and while clogging of magnetic head is not detected, the operation of the detecting unit of clogging of magnetic head is stopped. The invention also discloses to turn off the power source of the detecting unit in the periods not detecting clogging of magnetic heads. As a result, power consumption can be saved. Therefore, the battery-operated video tape recorders can be used for a longer time. The invention further allows the user to set freely the periods for detecting clogging of magnetic heads, or the detecting sensitivity of clogging of magnetic head.

The invention also relates to a magnetic recording and reproducing apparatus having a plurality of sets, each set including a recording magnetic head and a reproducing magnetic head disposed at a position different from that the recording magnetic head disposed at, on a rotary cylinder, for drawing plural track patterns on a magnetic recording tape. In the magnetic recording and reproducing apparatus above, by switching the outputs of the reproducing magnetic heads, the detecting unit of clogging of magnetic head in the constitution described above is shared. As a result, the rise of power consumption due to the increase of number of magnetic heads does not occur owing to sharing of the detecting unit of clogging of magnetic head. Therefore, in addition to the effect of reducing the power consumption in the detecting unit of clogging of magnetic head in the constitution described above, the power consumption can be further kept low.

Examples of magnetic recording system for drawing plural track patterns on magnetic recording tape mentioned above include a system of recording television signals by separating into luminance signals and chrominance signals.

DESCRIPTION OF THE PREFERRED EMBODIMENTS

THE FIRST EMBODIMENT

Figure 1:
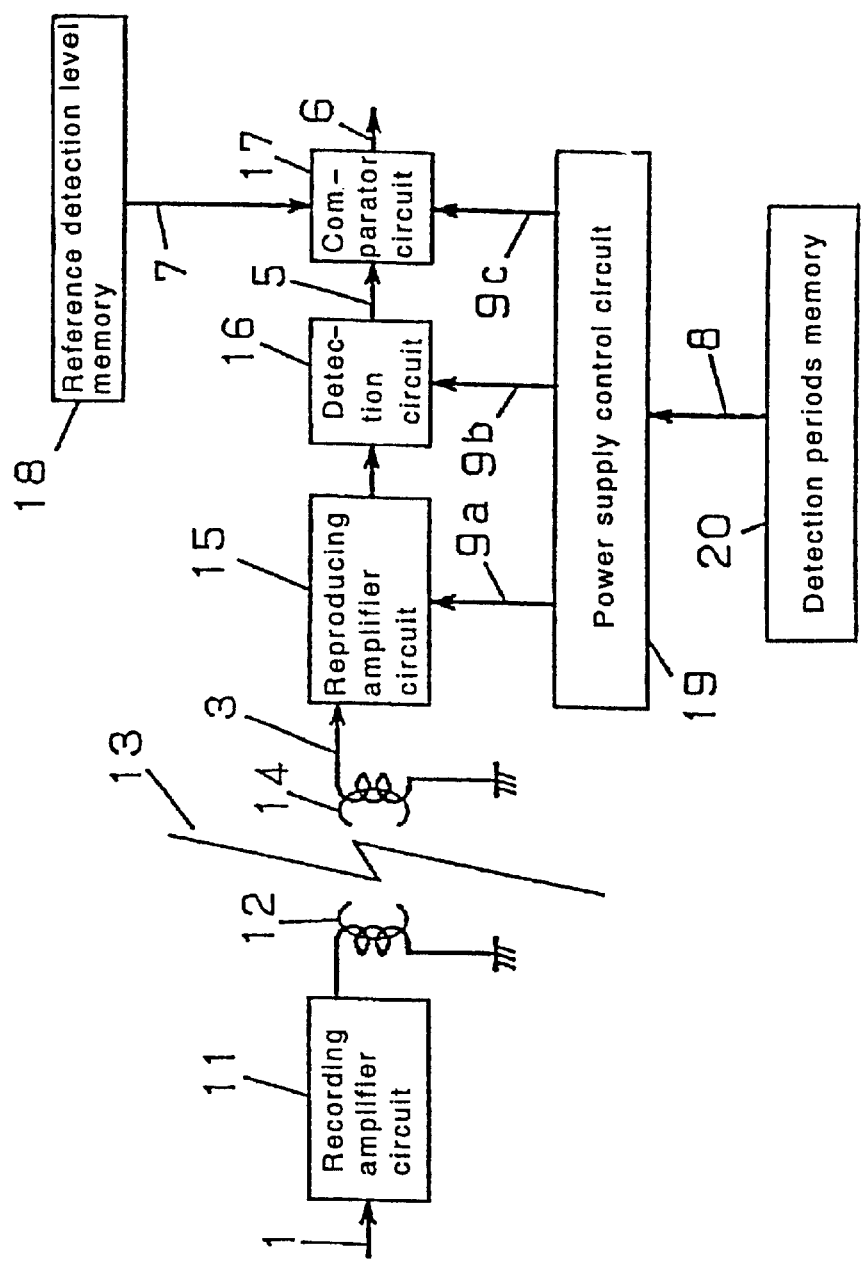
FIG. 1 is a block diagram of a magnetic recording and reproducing apparatus in an embodiment of the invention.
Figure 2:
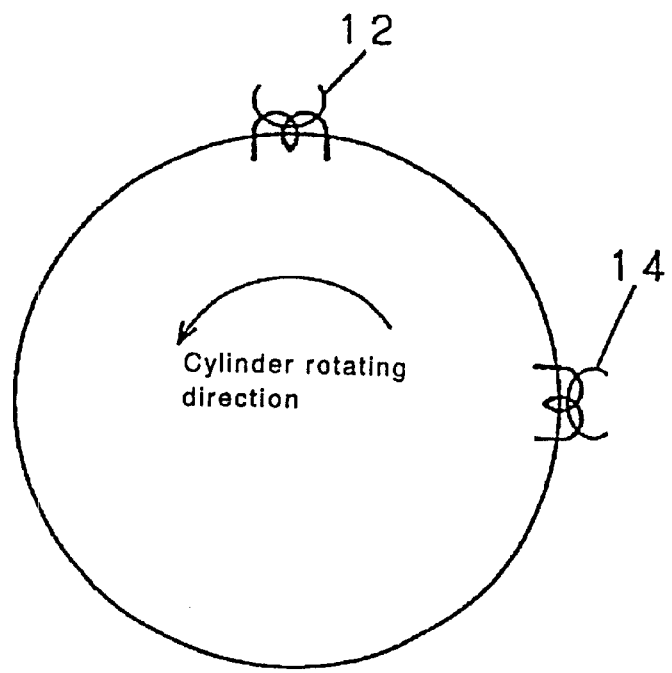
FIG. 2 is an explanatory diagram of rotary cylinder in the magnetic recording and reproducing apparatus in the embodiment of the invention.
Figure 3:
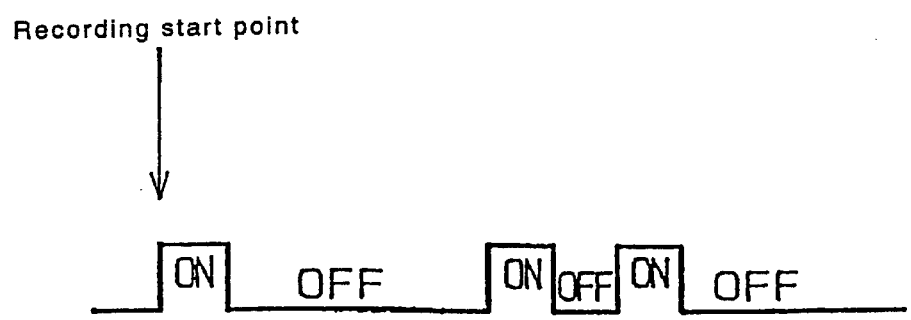
FIG. 3 is an explanatory diagram of period of power source control in the magnetic recording and reproducing apparatus of the invention.

An embodiment of the invention is described while referring to FIG. 1 to FIG. 3.

FIG. 2 shows a rotary cylinder. In FIG. 2, a recording magnetic head 12 is mounted on the rotary cylinder, prior to a reproducing magnetic head 14. Track patterns of a magnetic recording tape in which signals are recorded by the recording magnetic head 12 can be reproduced by the reproducing magnetic head 14.

FIG. 1 is a block diagram of the magnetic recording and reproducing apparatus in the embodiment of the invention. In FIG. 1, a recording signal 1 is amplified in a recording amplifier circuit 11, applied in the recording magnetic head 12, and is recorded in a magnetic recording tape 13.

Recorded track patterns are reproduced by the reproducing magnetic head 14. A reproduced signal 3 is amplified in a reproducing amplifier circuit 15, and is input to and detected in a detection circuit 16. The envelope 5 of the reproduced signal is output from the detection circuit 16.

The envelope 5 is put into a comparator circuit 17, and is compared with a reference detection level 7 set in a reference detection level memory 18. As a result, a magnetic head clogging detection signal output 6 is issued from the comparator circuit 17.

The reference detection level 7 defines the detection sensitivity of magnetic head clogging detection.

The reference detection level is set so that it is known that clogging of magnetic head deteriorates the video recording quality when the envelope 5 is smaller than the reference detection level 7.

Therefore, when the reference detection level is set high, even if the deterioration of video recording quality is small, for example, before the deterioration becomes visible, clogging of magnetic head is detected, and it is warned to the user. Conversely, when the reference detection level is set lower, warning is given only when reaching the level of detecting the deterioration of video recording quality.

A power supply control circuit 19 turns on or off the individual power supply of the reproducing amplifier circuit 15, detection circuit 16, and comparator circuit 17 according to the predetermined detection periods 8 of a detection periods memory 20. Reference numerals 9a to 9c are power supply lines for on/off control. By thus controlling the operation of the circuit contributing to detection of magnetic head clogging, clogging of magnetic head can be detected intermittently.

The predetermined detection periods 8 are described below.

The time width of detection periods are set in the detection periods memory 20 such that it is necessary and sufficient long for the reproducing amplifier circuit 15, detection circuit 16 and comparator circuit 17 to respond sufficiently to the input signals, so that detection of magnetic head clogging may be done at the intended video recording quality level with respect to the predetermined reference detection level. The time intervals of the individual detection periods are also set in the detection periods memory 20.

FIG. 3 is an explanatory diagram showing operation of power supply control of detecting unit of magnetic head clogging of the magnetic recording and reproducing apparatus in the embodiment of the invention.

As described above, the width of detection period and the interval between a detection period and a detection period are set in the detection periods memory 20. After the recording start point, clogging of magnetic head is detected. The power supply control circuit 19 shown in FIG. 1 turns on or off the power supply of the detecting unit of magnetic head clogging (composed of, in this embodiment, the reproducing amplifier circuit 15, detection circuit 16, and comparator circuit 17). Therefore, as shown in FIG. 3, clogging of magnetic head can be detected intermittently.

The following example is known as predetermined values of reference detection level 7 and predetermined detection periods 8.

As compared with the amplitude of the signal reproduced during normal recording, the reference detection level 7 is supposed to be about 50% thereof. By setting the interval of a detection period and next detection period at several seconds, and the width of the detection period at about 1/10 thereof, clogging is detected intermittently.

Setting of the reference detection level 7 and predetermined detection periods 8 is not limited to the above example, but other setting may be possible.

In this embodiment, as the predetermined detection periods 8, specified periods are set in the detection periods memory 20. As a more flexible method, the predetermined detection periods 8 can be changed from outside by using a keyboard, dial or switch. By the change of the software, too, the predetermined detection periods 8 can be changed.

In such constitution, the user can freely change the detection periods. It is hence possible to cope with specification changes flexibly. The user can also select the preference of either longer term of use by saving power consumption, or frequent detection, depending on the circumstances of use.

In this embodiment, as the reference detection level 7, a specified value is set in the reference detection level memory 18. Further, as the method flexible for the user, the reference detection level 7 can be changed from outside by using the keyboard, dial or switch. It is also possible to change the setting by the change of the software.

In this constitution, too, the user can freely change the reference detection level. It is hence possible to cope with specification changes flexibly. The user can select the reference detection level, that is, the sensitivity of detection, depending on the circumstances of use. If a higher detection sensitivity (easy-to-detect state) is desired, for example, to detect before reaching a visible level of deterioration of video recording quality, the reference detection level may be set higher. If a lower detection sensitivity (hard-to-detect state) is convenient for the user, for example, to detect only after reaching the visible level of deterioration of video recording quality, the reference detection level may be set lower.

THE SECOND EMBODIMENT

Figure 4:
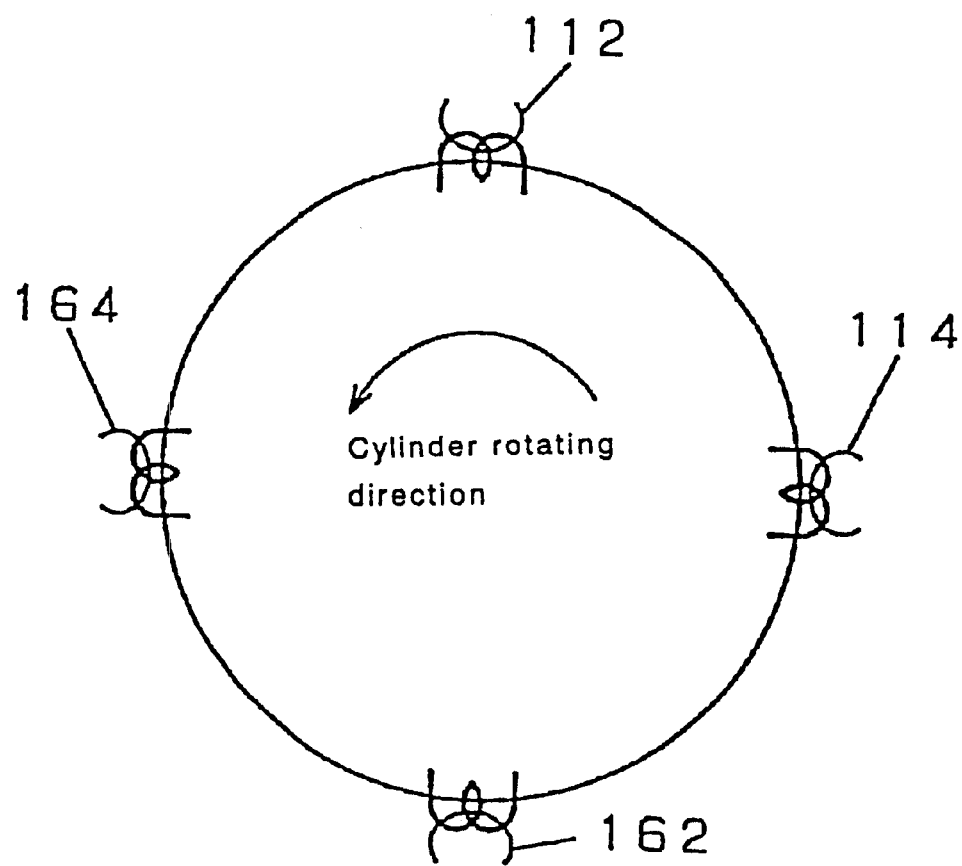
FIG. 4 is an explanatory diagram of rotary cylinder in the case of plural sets of magnetic heads in a magnetic recording and reproducing apparatus in an embodiment of the invention.

FIG. 4 shows a rotary cylinder of a magnetic recording and reproducing apparatus in other embodiment of the invention. In FIG. 4, the operation of the recording magnetic head and reproducing magnetic head is described.

A recording magnetic head L 112 is mounted on the rotary cylinder prior to a reproducing magnetic head L 114. Therefore, from the track pattern in which the signal is recorded by the recording magnetic head L 112, the signal can be reproduced by the reproducing magnetic head L 114.

A recording magnetic head R 162 is mounted on the rotary cylinder prior to a reproducing magnetic head R 164. Therefore, from the track pattern in which the signal is recorded by the recording magnetic head R 162, the signal can be reproduced by the reproducing magnetic head R 164.

Figure 5:
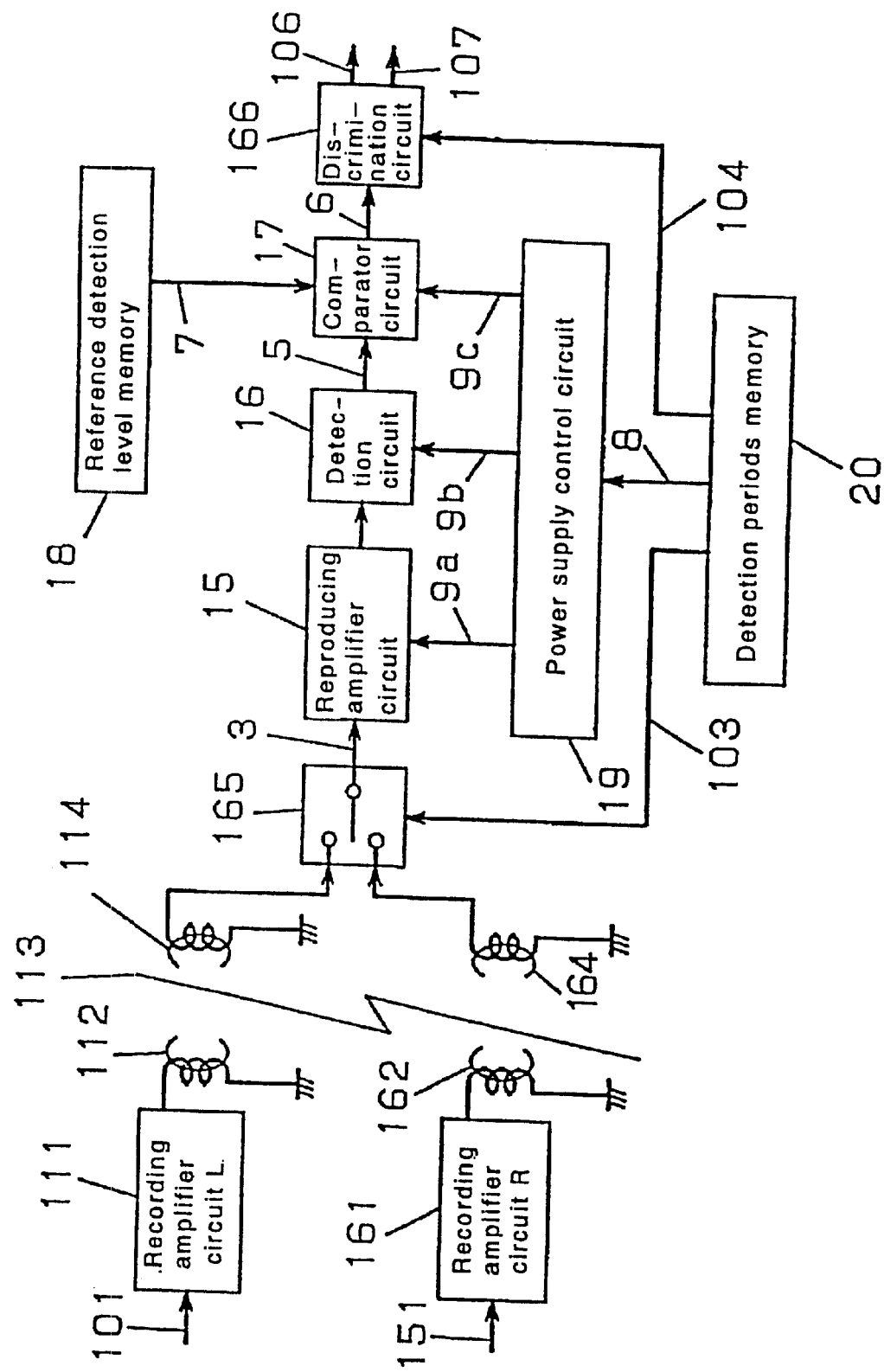
FIG. 5 is a block diagram in the case of plural sets of magnetic heads in a magnetic recording and reproducing apparatus in an embodiment of the invention.

FIG. 5 is a block diagram of the magnetic recording and reproducing apparatus in the embodiment of the invention.

In FIG. 5, the operation of the circuit parts is described below.

A recording signal L 101 and a recording signal R 151 are amplified in recording amplifier circuits 111 and 161, respectively. Then, these recording signals are applied into a recording magnetic head 112 and a recording magnetic head 162, and recorded in a magnetic recording tape 113. The signals recorded in the track pattern are reproduced by a reproducing magnetic head L 114 and a reproducing magnetic head R 164. The outputs of the reproducing magnetic head L 114 and reproducing magnetic head R 164 are selected by a switching circuit 165 according to a switching timing signal 103 set by the detection periods memory 20, and issued to next stage.

Concerning the above operation, the predetermined detection periods 8 and switching timing signal 103 are described below.

For both of the following two signals, the time necessary and sufficient for detecting accurately the magnetic head clogging, allowing the circuit relating to detection of magnetic head clogging to respond to the input signals is set as the time width of detection periods in the detection periods memory 20.

1) The signal recorded by the recording magnetic head L 112 and reproduced by the reproducing magnetic head L 114
2) The signal recorded by the recording magnetic head R 162 and reproduced by the reproducing magnetic head R 164

The time interval of the individual detection periods is also set in the detection periods memory 20 in the same manner as in the preceding embodiment.

The switching timing signal 103 changes a switching circuit 165 so as for predetermined detection periods to be assigned to the above signals 1) and 2). The switching timing signal 103 is set in the detection periods memory 20.

The reproduced signal 3 issued from the switching circuit 165 is amplified in the reproducing amplifier circuit 15, and is input to the detection circuit 16. In the detection circuit 16, the envelope 5 of the reproduced signal is output. The envelope 5 is put into the comparator circuit 17, and is compared with the reference detection level 7 preset in the reference detection level memory 18. Comparing the level of the envelope 5 and the level of reference detection level 7, the magnetic head clogging detection output 6 is issued from the comparator circuit 17. In this operation, the reference detection level 7 is set in the same manner as in the first embodiment.

The power supply control circuit 19 turns on or off the power supply of the reproducing amplifier circuit 15, detection circuit 16, and comparator circuit 17, according to the predetermined detection periods 8 of the detection periods memory 20. Reference numerals 9a to 9c are power supply lines for on/off control. Thus, magnetic head clogging can be detected intermittently.

The magnetic head clogging detection output 6 is put into a discrimination circuit 166. According to a discrimination timing signal 104, the following two signals are discriminated and issued from the discrimination circuit 166.

1) The magnetic head clogging detection output L 106 recorded by the recording magnetic head L 112, and reproduced by the reproducing magnetic head L 114
2) The magnetic head clogging detection output R 107 recorded by the recording magnetic head R 162, and reproduced by the reproducing magnetic head R 164

The discrimination timing signal 104 is set in the detection periods memory 20 according to the predetermined detection periods 8.

As described herein, the desired operation is realized by one magnetic head clogging detecting unit. Then, it is not required to have two sets of magnetic head clogging detecting units corresponding to two recording signals, that is, recording signal L and recording signal R. That is, by the operation of the switching circuit 165, the circuits of the reproducing amplifier circuit 15, detection circuit 16, comparator circuit 17, reference detection level memory 18, power supply control circuit 19, and detection periods memory 20 (the magnetic head clogging detecting unit in the embodiment) can be shared.

In the embodiment, magnetic head clogging is detected intermittently in the detection periods. The magnetic head clogging detection may be made either in equal time intervals or not equal.

To suppress the power consumption, the power supply on/off of the reproducing amplifier circuit 15, detection circuit 16 and comparator circuit 17 is controlled, but the same object may be achieved, for example, by lowering the supply voltage.

By using the discrimination circuit 166, the magnetic head clogging detection output L 106 and magnetic head clogging detection output R 107 are issued separately. In a circuit after the comparator circuit 17, for example, it may be possible to input the output signals into the microcomputer, and discriminate them according to the instruction of the software.

If having a plurality of magnetic heads, regardless of the quantity, the similar constitution of the invention may be realized. The reference detection level 7 may be either one or different values set individually for magnetic heads.

Thus, in the magnetic recording and reproducing apparatus of the invention, clogging of magnetic head for recording is detected intermittently at the time of recording only in predetermined periods. In the periods not detecting magnetic head clogging, the power supply is turned off in the magnetic head clogging detecting unit. As a result, power consumption in the magnetic head clogging detecting unit can be kept low. Therefore, it contributes to saving of the power consumption for long-term use of video tape recorders such as a video tape recorder with a built-in camera driven by a battery.

In the magnetic recording and reproducing apparatus of the invention having a plurality of recording magnetic heads and reproducing magnetic heads disposed on a rotary cylinder for drawing plural track patterns on a magnetic recording tape, by changing over the outputs of the reproducing magnetic heads, the detecting parts can be shared. As a result, the power consumption rise due to the increase in the number of magnetic heads can be reduced.

Along with the decrease of power consumption by sharing of the circuit, the decrease of power consumption by the intermittent detection of magnetic head clogging as mentioned above can keep the power consumption low. Therefore, they contribute to saving of power consumption for long-term use of video tape recorders such as a video tape recorder with a built-in camera driven by a battery.

What is claimed is:

1. A magnetic recording and reproducing apparatus comprising:
    a recording magnetic head on a rotary cylinder,
    a reproducing magnetic head disposed at a position different from a position at which said recording magnetic head is disposed, on the rotary cylinder, and
    a magnetic head clogging detecting unit for detecting clogging of said recording magnetic head by monitoring the output of said reproducing magnetic head,
    wherein magnetic head clogging is detected intermittently in predetermined periods while recording is occurring such that there are substantially equal time intervals between the predetermined periods.

2. A magnetic recording and reproducing apparatus of claim 1, wherein said predetermined periods can be set by a user.

3. A magnetic recording and reproducing apparatus of claim 2, wherein the detection sensitivity of magnetic head clogging detection can be set by a user.

4. A magnetic recording and reproducing apparatus of claim 2, being a magnetic recording and reproducing apparatus having a plurality of sets, each set including a recording magnetic head and a reproducing magnetic head disposed at a position different from a position at which the recording magnetic head is disposed, on a rotary cylinder, for drawing plural track patterns on a magnetic recording tape, wherein by switching the outputs of the reproducing magnetic heads, and putting said outputs into one magnetic head clogging detecting unit, the magnetic head clogging detecting unit is shared.

5. A magnetic recording and reproducing apparatus of claim 1, wherein the detection sensitivity of magnetic head clogging detection can be set by a user.

6. A magnetic recording and reproducing apparatus of claim 5, being a magnetic recording and reproducing apparatus having a plurality of sets, each set including a recording magnetic head and a reproducing magnetic head disposed at a position different from a position at which the recording magnetic head is disposed, on a rotary cylinder, for drawing plural track patterns on a magnetic recording tape, wherein by switching the outputs of the reproducing magnetic heads, and putting said outputs into one magnetic clogging detecting unit, the magnetic head clogging detecting unit is shared.

7. A magnetic recording and reproducing apparatus of claim 1, being a magnetic recording and reproducing apparatus having a plurality of sets, each set including a recording magnetic head and a reproducing magnetic head disposed at a position different from a position at which the recording magnetic head is disposed, on a rotary cylinder, for drawing a plural track patterns on a magnetic recording tape, wherein by switching the outputs of the reproducing magnetic heads, and putting said outputs into one magnetic head clogging detecting unit, the magnetic head clogging detecting unit is shared.

8. A magnetic recording and reproducing apparatus according to claim 1, wherein said magnetic head clogging is detected intermittently in predetermined periods while said recording magnetic head is in the recording operation, and the operation of said magnetic head clogging detecting unit is stopped in other periods than said predetermined periods.

9. A magnetic recording and reproducing apparatus according to claim 1, wherein said magnetic head clogging is detected intermittently in predetermined periods only while said recording magnetic head is in the recording operation, and the operation of said magnetic head clogging detecting unit is stopped in other periods than said predetermined periods.

10. A magnetic recording and reproducing apparatus according to claim 1, wherein said magnetic head clogging is detected intermittently in predetermined periods while said recording magnetic head is in the recording operation, and a power supply of said magnetic head clogging detecting unit is cut off in other periods than said predetermined periods.

11. A magnetic recording and reproducing apparatus according to claim 1, wherein said magnetic head clogging is detected intermittently in predetermined periods only while said recording magnetic head is in the recording operation, and a power supply of said magnetic head clogging detecting unit is cut off in other periods than said predetermined periods.

* * * * *